Sept. 4, 1923.

G. F. BULL 1,466,787

LAWN MOWER

Filed June 9, 1922

INVENTOR

George F. Bull

By Richards & Geier Attys

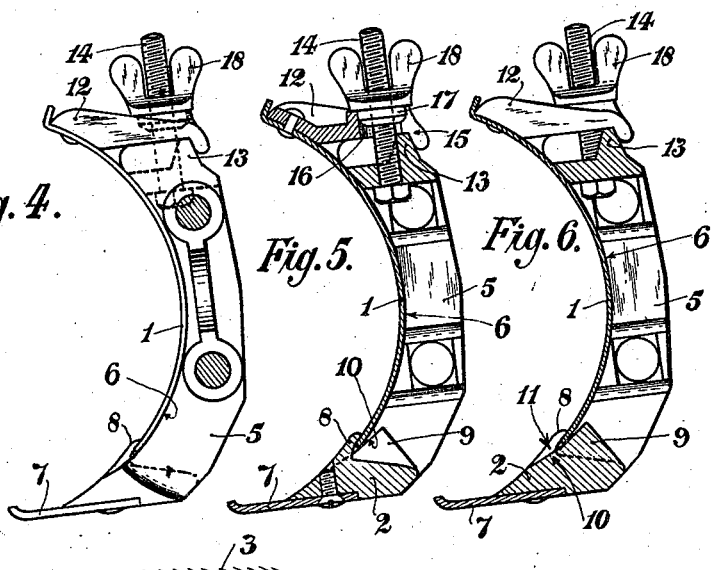

Patented Sept. 4, 1923.

1,466,787

UNITED STATES PATENT OFFICE.

GEORGE FREDERICK BULL, OF BIRMINGHAM, ENGLAND, ASSIGNOR OF ONE-HALF TO CHARLES H. PUGH LIMITED, OF BIRMINGHAM, ENGLAND.

LAWN MOWER.

Application filed June 9, 1922. Serial No. 566,967.

*To all whom it may concern:*

Be it known that I, GEORGE FREDERICK BULL, subject of the King of Great Britain, residing at Birmingham, England, have invented certain new and useful Improvements in Lawn Mowers, of which the following is a specification.

This invention relates to lawn-mowers, and has more particular reference to the grass conveyors thereof whereby the cut grass is conveyed into the grass-box of the machine from the cutters of the same. It is not always desired, however to use the grass-box, and the same is then removed from the machine with the result that the cut grass is directed by means of the conveyor into the path of the machine. Thus, this cut grass is passed and re-passed through the machine giving the latter extra and unnecessary work to perform and also tending to clog the cutters thereof. To overcome this defect it has been proposed to make the said conveyor detachable so that it can be removed from the machine when the same is being used without the grass-box, the result being that the grass coming from the cutters is directed to the rear of the machine.

The object of this invention is to provide an improved form of detachable grass-conveyor for lawn-mowers.

According to the present invention the grass conveyor comprises a suitably shaped plate mounted upon rigid skeleton framework members so that the lower edge of the conveyor plate is disposed behind a ledge upon the said skeleton framework member and rests upon a plurality of seatings located to the rear of the said ledge, suitable means being provided for readily attaching the plate to, or detaching the same from, the aforesaid framework member.

Figure 4 is a transverse section through the grass-conveyor taken upon the line 4—4, Figure 2.

Figure 5 is a transverse section through the grass conveyor taken upon the line 5—5, Figure 2.

Figure 6 is a transverse section through the grass conveyor taken upon the line 6—6, Figure 2.

Figure 7 is a plan view of one end of the grass conveyor part of the wing-nut being in section.

Figure 8 is a transverse section through the grass conveyor taken upon the line 8—8, Figure 2, the conveyor plate being shown detached.

Figure 1:
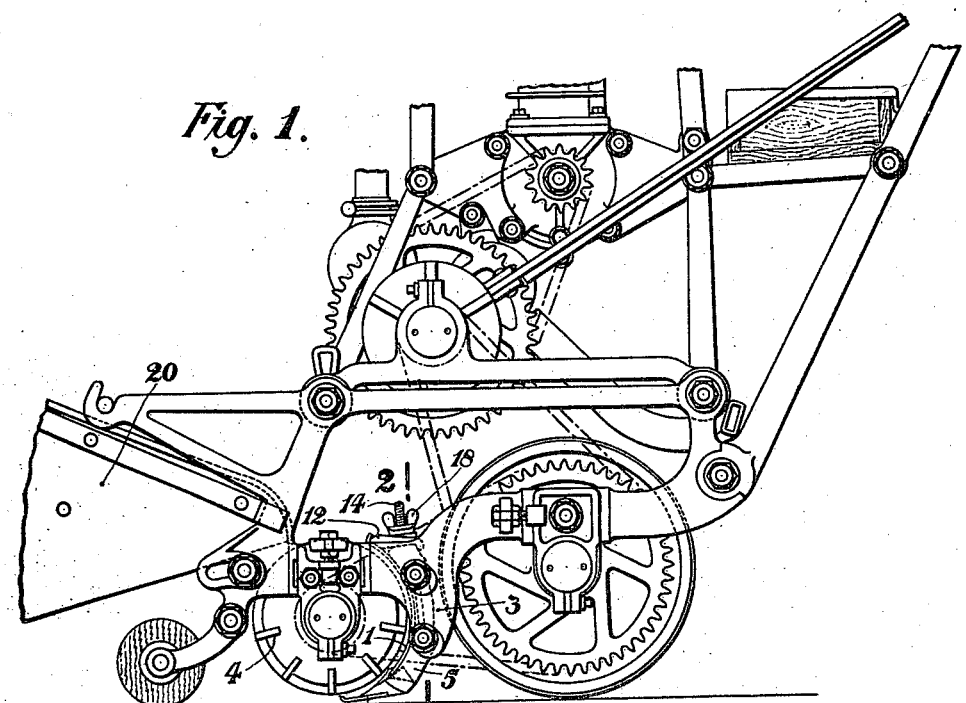
Figure 1 is a side elevation of a power-driven lawn-mower having this invention fitted thereto.
Figure 2:
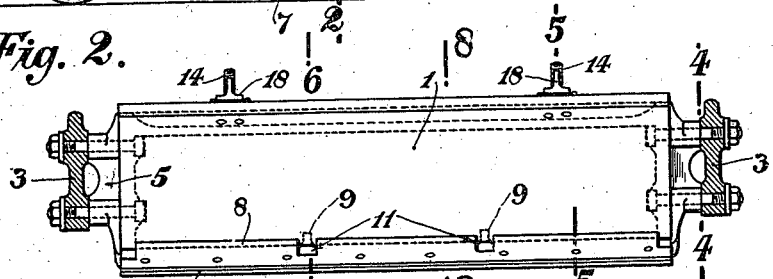
Figures 2 and 3 are front and rear elevations respectively of the grass conveyor, the frame of the machine being cut away upon the line 2—2, Figure 1.
Figure 3:
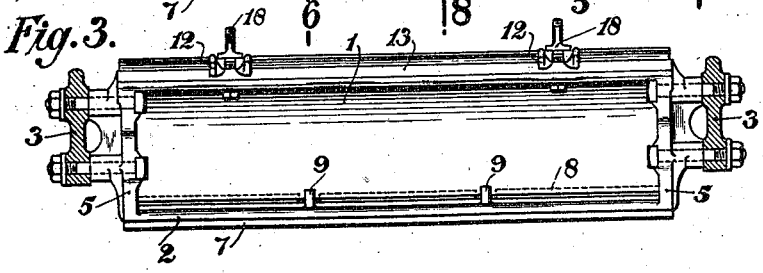

In carrying out of the invention as illustrated upon the accompanying drawings, the detachable conveyor-plate 1 is mounted upon a rectangular and substantially vertically disposed skeleton framework member 2 which is rigidly bolted to the frame 3 of the machine. This framework member is transversely curved to accommodate the revolving cutter 4 of the machine, the end members 5 thereof forming seatings 6 for the similarly curved conveyor-plate 1. Attached to the lower longitudinal side of the skeleton frame-work member is the fixed cutter 7 of the machine, while slightly to the rear of its centre this side is provided with a ledge 8 running throughout the length thereof. Disposed to the rear of this ledge are two projections 9 which form seatings 10 upon which the lower edge of the detachable conveyor-plate is adapted to be supported. These seatings 10 are forwardly and downwardly inclined and are disposed equidistant from their adjacent ends of the framework member and from each other. The depth of the aforesaid ledge 8 is greater than the distance from the top of the latter to the seatings 10, so that any dirt accumulating behind the ledge is pushed away by the lower edge of the conveyor-plate when the latter is fitted in position. To avoid the accumulation of dirt upon the aforesaid seatings, between the same and the ledge, the latter is cut away in front of the seatings to form grooves 11 the bases of which form continuations of the said seatings. Thus, any dirt upon the latter is pushed by the lower edge of the conveyor-plate down into the grooves, so that the said edge will at all times properly seat itself upon the seatings 10.

Secured to the rear of the upper edge of the conveyor-plate is a pair of claw members 12 disposed one adjacent each end thereof. These members engage a rib 13 upon the upper longitudinal side of the framework member, the rear edge of this rib being rearwardly and downwardly inclined so that upon the claw members being forced over the rib, as will be hereinafter explained, they are moved downwardly and rearwardly. The outer ends of the claw members are bifurcated to receive the vertically-disposed bolts 14 carried by the upper side of the skeleton framework member, the inner ends of the slots 15 thus formed being provided with recesses 16 which are adapted to receive shoulders 17 upon wing-nuts 18 screwed on to the bolts. The lower edges 19 of these shoulders are preferably bevelled to facilitate the positioning of the plate during the fitting of the latter.

To attach the conveyor-plate 1 to the skeleton framework member 2 the bifurcated claw members 12 upon the plate are passed over the aforesaid bolts 14 and the lower edge of the plate behind the ledge 8 upon the lower side member of the framework member. The wing-nuts 18 are next screwed down so that the bevelled shoulders 19 thereon enter the aforesaid recesses in the claw members. Upon the wing-nuts being screwed down further they take with them the claw members which are drawn downwardly and rearwardly through engaging with the inclined rear edge of the rib 13 upon the upper side member of the skeleton framework member. This imparts to the conveyor-plate a downward circular movement until the lower edge thereof firmly seats itself upon the aforesaid seatings 10, whereupon the plate is securely locked in position.

To detach the plate the above operation is reversed.

When the machine is being used with the grass-box 20, the conveyor-plate is fixed in position upon the skeleton framework member and so directs the cut grass into the grass box. When the machine is used without the latter the conveyor-plate is also removed, so that the grass coming from the cutters passes through the skeleton framework member to the rear of the machine.

Having fully described our invention, what we desire to claim and secure by Letters Patent is:—

1. A grass conveyor for lawn-mowers having a rigid skeleton framework member, a ledge upon the framework member, a detachable conveyor plate mounted upon the said framework member with its lower edge disposed behind the said ledge, a plurality of seatings upon which the said lower edge of the conveyor plate rests, and means for readily attaching the plate to and detaching the same from the aforesaid framework member.

2. A grass conveyor for lawn mowers having a rigid skeleton framework-member, seatings mounted upon the lower side of the framework member, a ledge upon the said lower side having grooves located in front of the said seatings, a detachable conveyor-plate mounted upon the said framework member with its lower edge resting upon the seatings and disposed to the rear of the said ledge and means for readily attaching the plate to and detaching the same from the aforesaid framework member.

3. A grass conveyor for lawn-mowers having a rigid skeleton framework member, seatings mounted upon the lower side of the framework member, a ledge upon the said lower side having grooves located in front of the said seatings and whose depth is greater than the distance from the top thereof to the seatings a detachable conveyor-plate mounted upon the said framework member with its lower edge resting upon the seatings and disposed to the rear of the said ledge and means for readily attaching the plate to and detaching the same from the aforesaid framework member.

4. A grass conveyor for lawn-mowers having a rigid skeleton framework member, a ledge upon the framework member, a detachable conveyor plate mounted upon the said framework member with its lower edge disposed behind the said ledge, a plurality of seatings upon which the said lower edge of the conveyor plate rests, a claw member upon the detachable conveyor plate, an inclined face upon the framework member with which the said claw member engages, and means for forcing the claw member over the inclined face so that it is moved downwardly and rearwardly thus imparting to the conveyor plate a downward circular movement and at the same time securely locking the plate in position.

5. A grass conveyor for lawn-mowers having a rigid skeleton framework member, seatings mounted upon the lower side of the framework member, a ledge upon the said lower side having grooves located in front of the said seatings and whose depth is greater than the distance from the top thereof to the seatings a detachable conveyor-plate mounted upon the said framework member with its lower edge resting upon the seatings and disposed to the rear of the said ledge and means for readily attaching the plate to and detaching the same from the aforesaid framework member, and a claw member upon the detachable conveyor plate, an inclined face upon the framework member with which the said claw member engages, and means for forcing the claw member over the inclined face so that it is moved downwardly and rearwardly thus imparting to the conveyor plate a downward circular movement and at the same time securely locking the plate in position.

In testimony whereof I have hereunto set my hand in presence of two subscribing witnesses.

GEORGE FREDERICK BULL.

Witnesses:
W. L. SKERRETT,
H. N. SKERRETT.